(12) United States Patent
Gulstone

(10) Patent No.: US 7,535,844 B1
(45) Date of Patent: May 19, 2009

(54) METHOD AND APPARATUS FOR DIGITAL SIGNAL COMMUNICATION

(75) Inventor: Nigel A. Gulstone, Santa Clara, CA (US)

(73) Assignee: Xilinx, Inc., San Jose, CA (US)

( * ) Notice: Subject to any disclaimer, the term of this patent is extended or adjusted under 35 U.S.C. 154(b) by 1073 days.

(21) Appl. No.: 10/767,234

(22) Filed: Jan. 28, 2004

(51) Int. Cl.
H04J 3/14 (2006.01)
(52) U.S. Cl. .................. 370/236; 370/229; 370/235; 714/799; 714/807
(58) Field of Classification Search .......... 370/352, 370/463, 473, 476, 229, 230, 231, 235, 236, 370/351, 462, 474
See application file for complete search history.

(56) References Cited

U.S. PATENT DOCUMENTS

| | | | | |
|---|---|---|---|---|
| 5,619,497 | A * | 4/1997 | Gallagher et al. | 370/394 |
| 5,784,387 | A * | 7/1998 | Widmer | 714/752 |
| 5,832,310 | A * | 11/1998 | Morrissey et al. | 710/71 |
| 6,233,073 | B1 * | 5/2001 | Bowers et al. | 398/16 |
| 6,321,361 | B1 * | 11/2001 | Autechaud et al. | 714/807 |
| 6,529,971 | B1 * | 3/2003 | Thiesfeld | 710/53 |
| 7,003,407 | B1 * | 2/2006 | Kari et al. | 702/57 |
| 7,305,047 | B1 * | 12/2007 | Turner | 375/316 |
| 2004/0088574 | A1 * | 5/2004 | Walter et al. | 713/201 |
| 2004/0141521 | A1 * | 7/2004 | George | 370/463 |
| 2004/0174867 | A1 * | 9/2004 | Nelson et al. | 370/352 |
| 2004/0252720 | A1 * | 12/2004 | Xiong et al. | 370/473 |
| 2005/0030978 | A1 * | 2/2005 | Dropps et al. | 370/512 |
| 2005/0060476 | A1 * | 3/2005 | Tamura et al. | 710/305 |
| 2005/0238064 | A1 * | 10/2005 | Winter et al. | 370/906 |

OTHER PUBLICATIONS

U.S. Appl. No. 10/234,978, Cory et al., filed Sep. 3, 2002.
U.S. Appl. No. 10/082,490, Cory, filed Feb. 22, 2002.
U.S. Appl. No. 10/090,250, Menon et al., filed Mar. 1, 2002.
Aurora Protocol Specification, v1.3, SP002 (v1.3) Jun. 21, 2004, Xilinx, Inc. 2100 Logic Drive, San Jose, CA 95124.
Aurora Reference Design User Guide, v2.0, UG061 (v2.2 beta) Oct. 12, 2004, Xilinx, Inc. 2100 Logic Drive, San Jose, CA 95124.
Aurora_201 Reference Design User Guide v1.2, UG050 (v1.2) Oct. 20, 2003, Xilinx, Inc. 2100 Logic Drive, San Jose, CA 95124.

(Continued)

*Primary Examiner*—Aung S Moe
*Assistant Examiner*—Abdullah Riyami
(74) *Attorney, Agent, or Firm*—Walter D. Fields; W. Eric Webostad

(57) ABSTRACT

A communication circuit comprises a plurality of receivers to receive the serial data from multiple lanes of a communication channel. The receivers may convert data received from the lanes from a serial to parallel format. Decoders may identify characters recovered from the different lanes, which collectively may define a word of width (i.e., character width) related to the number of lanes. Logic may determine when at least one of a start-of-frame and an end-of-frame character has been received. Parsing circuitry may then determine valid characters of a received word based on their placement relative to a start-of-frame character and/or an end-of-frame character. A controller may control when to present recovered data to at least one of storage registers or an output port, based on the character type identified by the decoder, its placement, an amount of characters parsed, and the number of characters already stored.

39 Claims, 7 Drawing Sheets

OTHER PUBLICATIONS

Aurora_804 Reference Design User Guide, v1.3, UG045 (v1.3) Oct. 20, 2003, Xilinx, Inc. 2100 Logic Drive, San Jose, CA 95124.
LocalLink Interface Specification, SP006 (v2.0) Jul. 25, 2005, Xilinx, Inc. 2100 Logic Drive, San Jose, CA 95124.
RocketIO Transceiver User Guide, UG024 (v2.5) Dec. 9, 2004, Xilinx, Inc. 2100 Logic Drive, San Jose, CA 95124.
Aurora Protocol Specification, v1.2, SP002 (v1.2) Oct. 20, 2003, Xilinx, Inc. 2100 Logic Drive, San Jose, CA 95124.

* cited by examiner

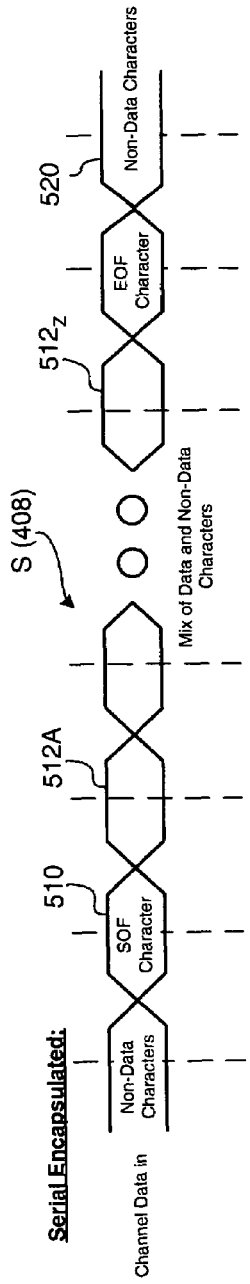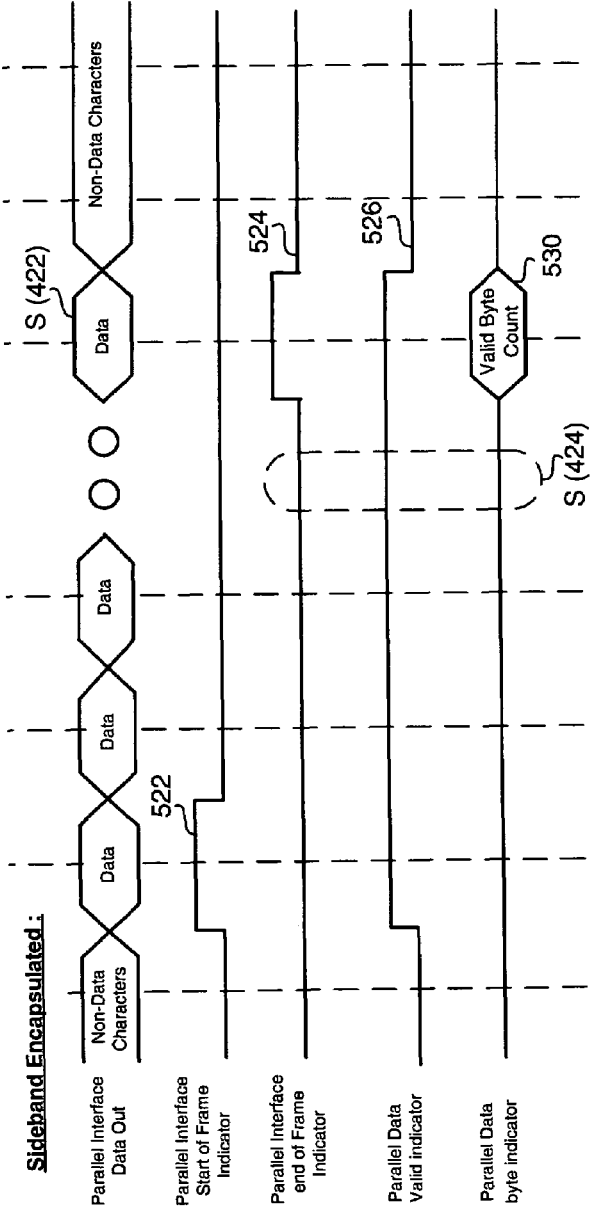

METHOD AND APPARATUS FOR DIGITAL SIGNAL COMMUNICATION

RELATED APPLICATIONS

This application is related to co-pending U.S. patent application Ser. Nos. 10/082,490, 10/090,250, and 10/234,978, each commonly owned by the assignee of the present application and incorporated herein by reference in its entirety.

FIELD OF THE INVENTION

The present disclosure relates to digital data communication across a multi-lane, digital data communication channel; and more particularly to circuits and methods to interface a multi-lane channel that may comprise a variety of different widths.

BACKGROUND

With the evolution of digital data communications, there seems to be a continual demand for data processing devices that may be capable of handling more data and with faster throughput.

At the same time, the semiconductor industry seems to continually strive to build integrated circuits of greater density and smaller size. But these increased levels of integration and functionality have placed a greater premium on the availability of signal interfacing.

To ease some of the effects of reduced I/O real estate, some manufacturers of high-speed data communication devices have developed transceivers (transmitters-receivers) with parallel-to-serial and serial-to-parallel data multiplexing/demultiplexing circuit designs. By using these multiplexing circuits, the high-pin count, parallel data interfaces may be replaced with lower pin count, high-speed serial data interfaces. On a receiver side of a transceiver, for example, a high-speed serial data sequence may be received from an I/O link and then converted into parallel data of a slower clock rate. Conversely, on the transmission side of the transceiver, parallel data of a low-clock rate may be converted from the parallel format into a higher-speed, serial format.

These high speed transceiver-multiplexers may be described as Multi-Gigabit Transceivers (MGT) and may handle serial bit streams with transfer speed as high as 3-10 gigabits per second, or even higher. The serial-to-parallel format conversion or de-multiplexing provided by these transceivers, however, may effectively reduce the high-speed data rate of the serial link to a slower cycle rate to accommodate performance levels of more customary, lower cost technology as may be associated with common embedded processors or memory.

For a serial bit stream encoded with, e.g., an 8 bit/10 bit "non-return to zero" encoding and comprising a bit transfer rate of 3 gigabits per second (Gbs), receiver decode and clock recovery processes may convert the encoded 10 bits to 8 bits. This 10B/8B decode in combination with serial-to-parallel conversion for 16 bits parallel data may establish an effective internal data handling cycle rate of about 150 MHz.

To further enhance the data transfer capacity of a given communication channel, a plurality of serial data transceivers may be disposed in parallel relationships to interface multiple serial lanes for the communication channel. Such augmentation can benefit a variety of different large data capacity applications as may be utilized by embedded data/video processors or memory, e.g., which may be embedded in a programmable logic device such as a field programmable gate array (FPGA).

When transferring information across a serial data interface, the data may be segmented into one or more data frames. A start of frame character may signal a starting byte to a given group of data. The transfer may then continue with multiple bytes of data within one or more words until an end of frame character may signal the end of the data frame. The framed data accordingly resides between the Start-Of-Frame (SOF) character and the End-Of-Frame (EOF) character and may comprise a multiple number of bytes of a single or of multiple words therebetween.

In a serial data transfer, the data bits for the SOF, data and EOF characters may be transferred in serial sequential manner. But when presenting the data to a processor or memory within a system, the start and end signals may be removed from before and after the data of the serial sequence, and may be presented in parallel accompanying sideband signals.

For a communication channel comprising a single serial lane, the removal of control characters and collection and/or storage of real data between the SOF and EOF characters may be performed with relative ease. Once a SOF character is determined, real data may be retrieved byte-by-byte and collected for presentment or storage (assuming it has been distinguished from idle characters) as it is received until determining receipt of an EOF character.

In the case of a communication channel that may comprise multiple serial data lanes, the collection and/or storage of the real data may become more cumbersome given that the SOF and the EOF characters could appear on any one of the channel lanes and given that they could appear within a signal word or across multiple words. In this context, "word" may reference a plurality of bytes. The word may comprise a width of a given number of bytes proportional the number of lanes that make-up the communication channel. Thus, the process for organizing the recovered data bytes for subsequent presentment or storage may vary depending on the placement of the SOF (and EOF) characters and the placement of the recovered data bytes in the data word(s) relative to the determined SOF character.

SUMMARY

In accordance with an embodiment of the present invention, a method of or apparatus for data processing may convert serial encapsulated data to sideband encapsulated data as may be suitable for on-board processor or memory applications.

In a particular embodiment, a multi-lane digital communication channel may provide a plurality of serial data signals. Receivers may receive and demultiplex serial data of respective ones of the plurality of serial data signals and format the serial data thereof into parallel character format. Decoders may decode character types of the demultiplexed characters and logic may determine a lane with a start-of-frame character. A parser may then validate characters based at least in part upon their placement relative to the determined SOF character.

In a further embodiment, the decoders and logic may be further operable to determine a lane with an end-of-frame (EOF) character either within the word recovered by the receivers the same as the SOF character or of a word recovered subsequently. The parser may be further operable to base the validation of the characters if framed between the SOF character and the EOF character of the same word or through multiple words.

In a further embodiment, the characters that have been validated may be further identified as comprising character types of the group consisting of real-data or idle characters.

An alignment circuit may then pack the characters identified as real-data into a contiguous group for one of a left or right alignment relative to the start or end respectively of the delineated data frame.

In a further embodiment, a controller may present the parsed real-data to a storage for storage or to an output port based on the character types identified by the decoders, their locations relative to the SOF character and the amount of characters of the alignment circuit and stored in storage.

BRIEF DESCRIPTION OF THE DRAWINGS

FIG. 5A is timing diagram useful for explaining an embodiment of the invention, and showing a serial data signal with serial encapsulation.

FIG. 5B is a timing diagram useful for explaining an embodiment of the invention, and showing a parallel data signal with accompanying control signals of sideband encapsulation.

DETAILED DESCRIPTION

In the following description, numerous specific details may be set forth to provide an understanding of exemplary embodiments of the present invention. It will be understood, however, that alternative embodiments may comprise sub-combinations of the disclosed examples.

Additionally, readily established circuits and procedures of the exemplary embodiments may be disclosed in simplified form (e.g., simplified block diagrams, flow chart, programming expressions and/or description) to avoid obscuring an understanding of the embodiments with excess detail.

Likewise, to aid a clear and precise disclosure, description of known processes—e.g., triggering, clocking, state-machine, programming procedures—may similarly be simplified where persons of ordinary skill in this art can readily understand their structure and operations by way of the drawings and disclosure.

Figure 1:
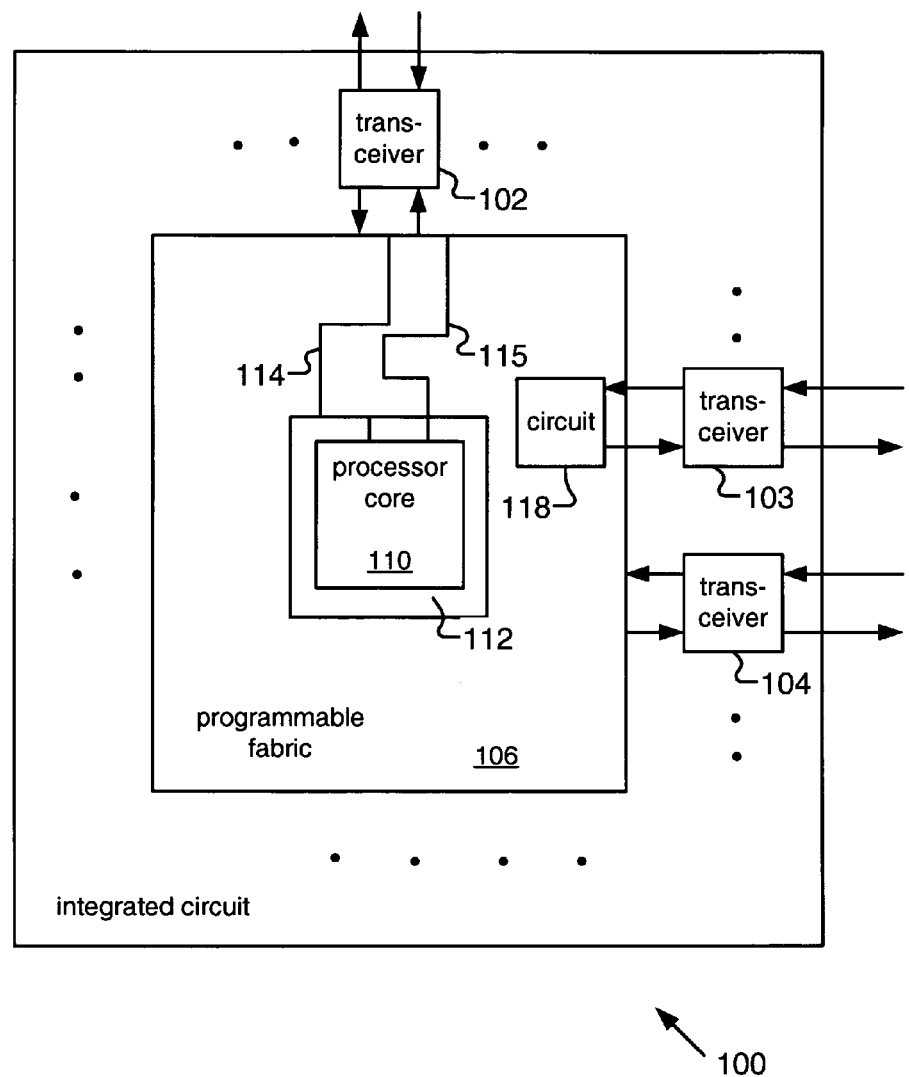
FIG. 1 shows a simplified block diagram of a data handling system in accordance with an embodiment of the present invention, showing serial data lines of a communication channel and a translation module to translate serially encapsulated data of the serial data lines into parallel format.

Referencing FIG. 1, an integrated system may comprise a plurality of transceivers such as transceivers 102-104, positioned to interface with embedded programmable fabric 106. In one embodiment, programmable fabric 106 may comprise a field programmable gate array (FPGA) fabric. One or more processor cores, such as processor core 110, can be optionally embedded inside programmable fabric 106. An interface layer 112 may facilitate communication between embedded processor core 110 and fabric 106. In certain embodiments, processor core 110 may be connected to one or more transceivers.

For example, further referencing FIG. 1, a pair of paths 114-115 may interface transceiver 102 to processor core 110 through interface layer 112. In certain embodiments, processor core 110 may comprise one of a variety of signal processing devices, such as a microprocessor, network processor, or video processor. In further embodiments, more than one processor core may be embedded inside programmable fabric 106.

A user may configure a plurality of circuits in programmable fabric 106. Some of these circuits may also communicate with transceivers 102-104. For example, further referencing FIG. 1, a circuit 118 of programmable fabric 106 may be coupled to communicate with transceiver 103. In particular embodiments of the present invention, at least one of the transceivers (in addition to programmable fabric 106) may be configurable.

Figure 2:
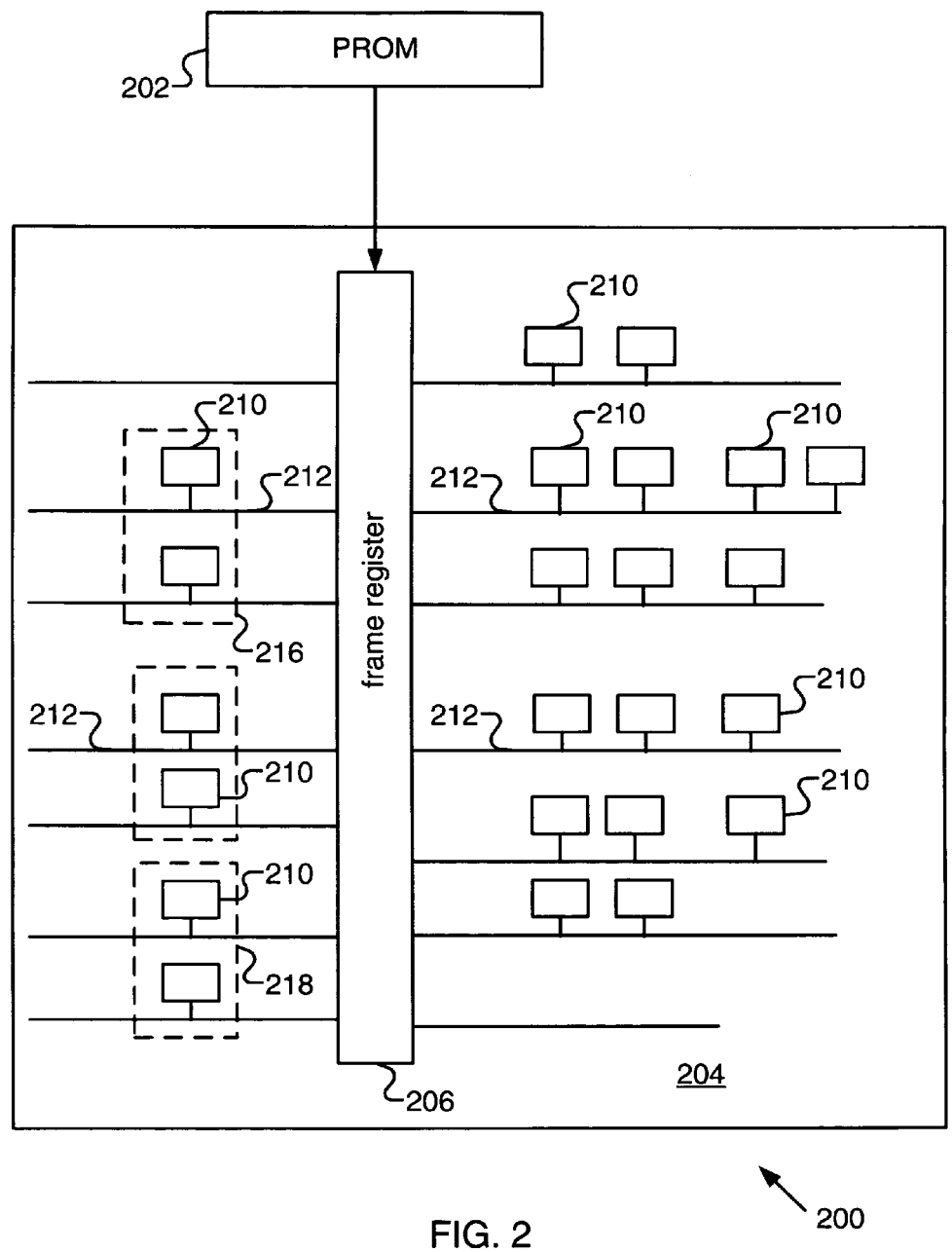
FIG. 2 is a schematic diagram of a programmable logic device that may be configured to form a data handling system in accordance with an embodiment of the present invention.

Referencing FIG. 2, system 200 may comprise a configurable programmable logic device such as FPGA 204. System 200 may also comprise a nonvolatile memory (such as a programmable read-only memory 202) that can be used to deliver configuration data to FPGA 204. FPGA 204 may comprise a plurality of configuration memory cells 210 that are connected to a frame register 206 through a plurality of buses 212. Buses 212 allow frame register 206 to set the states of memory cells 210 to configure FPGA 204.

Some of the configuration memory cells may be used to configure programmable fabric 106, while other configuration memory cells may be used to configure the transceivers (e.g., 102-104). For example, configurations memory cells in blocks 216 and 218 may be used to configure two separate transceivers, such as transceivers 103 and 104 in FIG. 1. For certain embodiments, there may be many configuration memory cells associated with a block.

Some memory cells may define logic block functions and a variety of interconnections to implement desired logic designs in programmable fabric or of a content addressable memory (CAM). Other memory cells, in exemplary embodiments of the present invention, may be used for purposes of programming performance of the transceiver. Some of the memory cells associated with the transceiver may further be used to modify routing of data in the transceiver, thereby including or excluding a sub-component of the transceiver to work with the data.

In a particular embodiment, a portion of the transceiver may be configured via data of the configuration memory cells and another portion may be configured via control values established by logic in the programmable fabric. In an alternative embodiment, the transceiver may be controlled entirely by the configuration memory cells. Likewise, in further embodiments, it may be controlled entirely via the configured logic.

Figure 3:
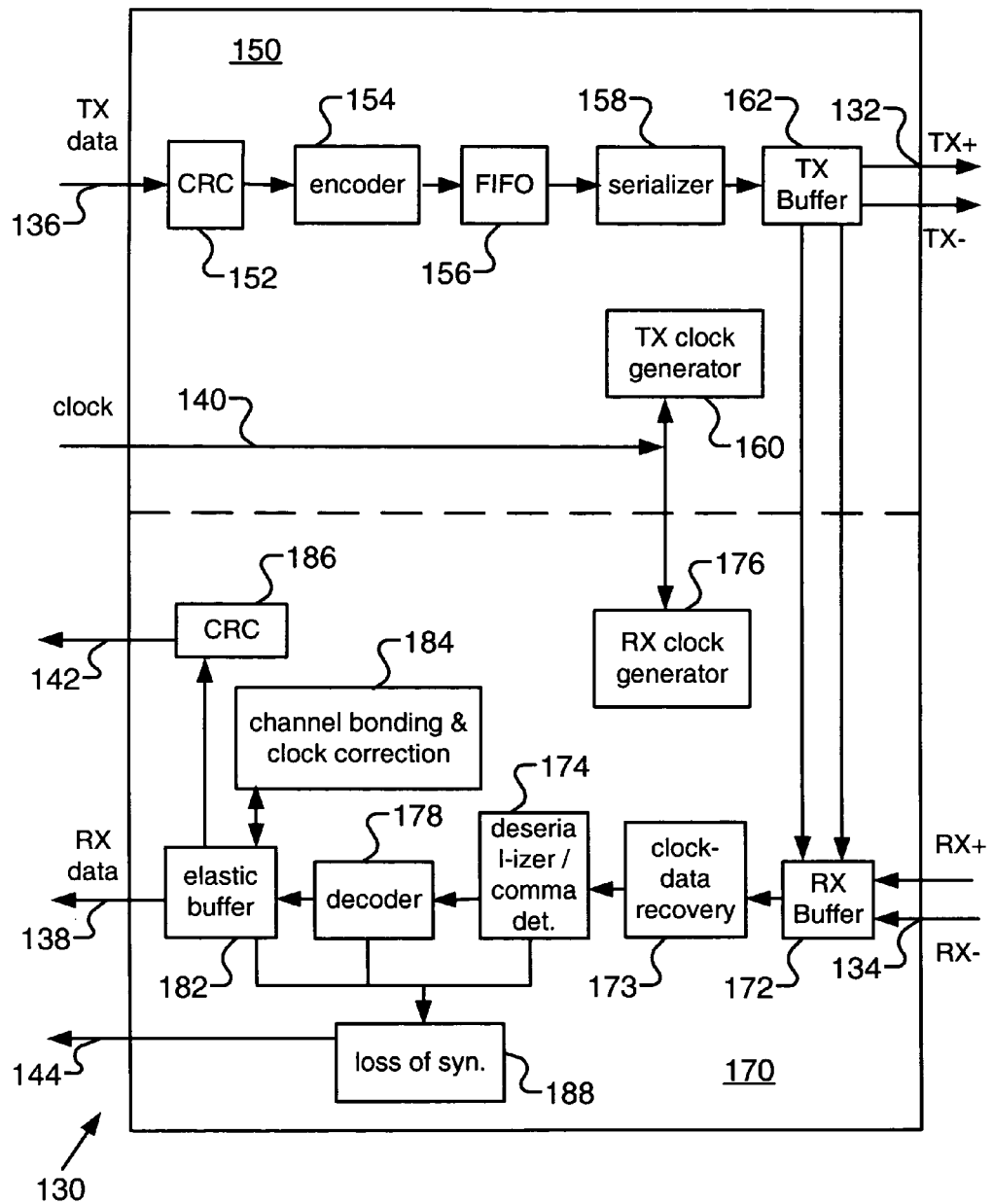
FIG. 3 is a simplified block diagram of a transceiver with a receiver circuit that may be used to receive serial data of a serial data line for translation in accordance with embodiments of the present invention.

Referencing FIG. 3, one example of transceiver 130 for interfacing a data processing system (not shown), may comprise ports 132 and 134 to communicate with an external device (not shown). Port 132 may interface differential output signals and input port 134 may receive differential input signals. Transceiver 130 may handle data to/from internal circuits of an integrated system or data processor via the respective transmit and receive data ports 136 and 138.

A plurality of clock signals (shown collectively along signal line 140) may support clocking of data at transmit buffer 162 and receive buffer 172. Transceiver 130 may further comprise cyclic redundancy code (CRC) circuitry 186 of known provisions for operating a CRC status signal 142. Additionally, synchronization status circuitry 188 may be operable to provide synchronization signal 144 dependent on whether or not synchronization has been established or lost.

In one embodiment, the width of the data paths 136 and 138 may be independently configurable and selected to be 1, 2, or 4 bytes. In other embodiments, the data paths 136 and 138 may have other widths.

Addressing the transmitter side 150 of transceiver 130, data of data path 136 may be selectably (or optionally) processed by a CRC generator 152. This CRC generator may compute and insert known CRC, such as a 32-bit CRC, into data packets for transmission. Because different protocols may handle data in different ways, CRC generator 152 may recognize data packet boundaries by which to perform CRC computation for appropriate sets of data.

The resultant CRC data may then be delivered to encoder 154. In one embodiment, encoder 154 may comprise a known 8B/10B encoder. For example, it may use the 8B/10B code having 256 data characters and 12 control characters that is used in the Gigabit Ethernet, XAUI, Fibre Channel, and InfiniBand protocols. The encoder may accept 8 bits of data along with a K-character signal for a total of 9 bits per character applied. If the K-character signal is "High", the data will be encoded into one of the 12 possible K-characters available in the 8B/10B code. If the K-character input is "Low", the 8 bits will be encoded as standard data. If the K-character input is "High", and a user applies other than one of the pre-assigned combinations, an error signal can be generated.

The encoded data may then be delivered to a transmit FIFO buffer 156. This buffer may interface encoder 154 to serializer 158. The encoder 154 may be controlled by a clock of the internal system on line 140. The serializer may be controlled by a reference clock generated by a transmit clock generator 160. These two clock signals may be frequency locked. Although frequency locked, the two clock signals may have different relative phase relationships. Accordingly, transmit FIFO buffer 156 may be operable to absorb phase differences between the two frequency-locked clock signals.

The data of FIFO buffer 156 may be delivered to serializer 158, which may multiplex the parallel digital data of FIFO 156 into a serial bit stream for transmission over a serial link. The serial bit stream may be output by transmit buffer 162, which may drive the serial bit stream onto a pair of differential lines of output port 132.

Turning now to the receiver side 170, transceiver 130 may further comprise a receiver clock generator 176 that may generate a reference clock signal to operate certain parts of the receiver. Receive buffer 172 may accept and buffer the serial data received from differential lines of input port 134. The buffered data signal may then be fed to a clock-data recovery block 173, which may recover a clock signal from transitions of the serial input signal. The clock recovered may comprise a frequency and phase based on that of the incoming serial data. This recovered clock may then be used to time the reception of the data within the deserializer 174, decoder 178 and elastic buffer 182.

Deserializer 174 may convert data of a serial bit format into parallel digital data. In a further embodiment, deserializer 174 may also perform comma detection. In some decoding algorithms, (such as the 8B/10B encoding), a "comma" may be used as a distinguishable pattern by which to assure determination of the byte boundaries within the serial data stream. For example, two comma patterns on known 8B/10B decoding may comprise a comma "plus" and a comma "minus". Detection of a comma may then define the byte alignments within the received serial bit stream. In one embodiment, programmable cells may establish control signals to control whether the comma detection circuit is to realign the byte boundaries on comma plus, comma minus, both, or neither.

In exemplary operation, decoder 178 may decode digital data that has been previously encoded. When enabled, it may decode and, in accordance with its selected configuration, raise a synchronous "comma" flag (as a status bit to be attached to each received byte at the transceiver's programmable fabric interface) on comma plus only, comma minus only, both, or neither. In further embodiments, it may set this flag for valid commas only.

Upon leaving decoder 178, the decoded data may be sent to an elastic buffer 182. Elastic buffer may perform channel bonding and clock correction as driven by clock correction controller 184. Elastic buffer 182 may be configurable for various configuration options such as:
 (a) use or bypass;
 (b) enablement of clock correction; and
 (c) levels to signal overflow or underflow conditions.

Configuration options might also include choice of channel bonding modes, the selection of a selectable number of channel bonding sequences, establishing a selectable length for matching a selectable byte value (8-bit or 10 bit), and similar provisions for clock correction sequences.

After re-synchronization by the elastic buffer, the data may then be delivered to an internal system, such as the programmable fabric, across data path 138. In one embodiment, the data width of data path 138 may be configurably selected to be 1, 2, or 4 bytes.

In further embodiments of the transceiver, elastic buffer 182 may be optionally connected to a known CRC verification block 186. This block may, for example, verify that the commonly used 32-bit cyclic redundant code (CRC) appears at the end of the received data packets. A signal may then be delivered to the internal system on line 142 to indicate the CRC verification.

Transceiver 130 may further comprise a loss of synchronization detector 188. It may interpret outputs of comma detector 174, decoder 178, and elastic buffer 182 to determine whether the incoming bytes of the data stream are in synchronization. A signal may then be delivered to the programmable fabric on line 144 to report the synchronization status.

Referring back to FIG. 2, in accordance with one embodiment, the configuration information for the configurable transceivers may be stored in programmable read-only memory "PROM" 202. A user may then select different options by delivering predetermined configuration data to FPGA 204.

Returning with reference to FIG. 1, communication system 100 may comprise a plurality of transceiver circuits (e.g., transceivers 102, 103, 104) working in parallel so as to increase the effective speed of data interfacing for a communication channel. For example, the data words of a transmitter may be spit into a plurality of bytes, and each byte may be propagated on a separate serial data lane of a multi-lane communication channel. The separate bytes may then be received in parallel by separate transceivers 102, 103, 104 of the communication system 100. However, it may be noted that the delay through one lane of the communication channel may differ from that of others. Accordingly, because one of the data words of the longer lane may not be properly synchronized relative to others when received at the receiver, it may be necessary for the separate words to be re-aligned, i.e., in which the received bytes may be arranged in proper sequential order at a receiver and configured to recover the original words. This re-alignment for proper recovery may be known as "channel bonding." When sending the data across the communication channel, it may be preformatted with serially delineated encapsulation. But when received at a receiving end, it may be necessary to reformat the data into sideband delineated encapsulation.

Figure 4:
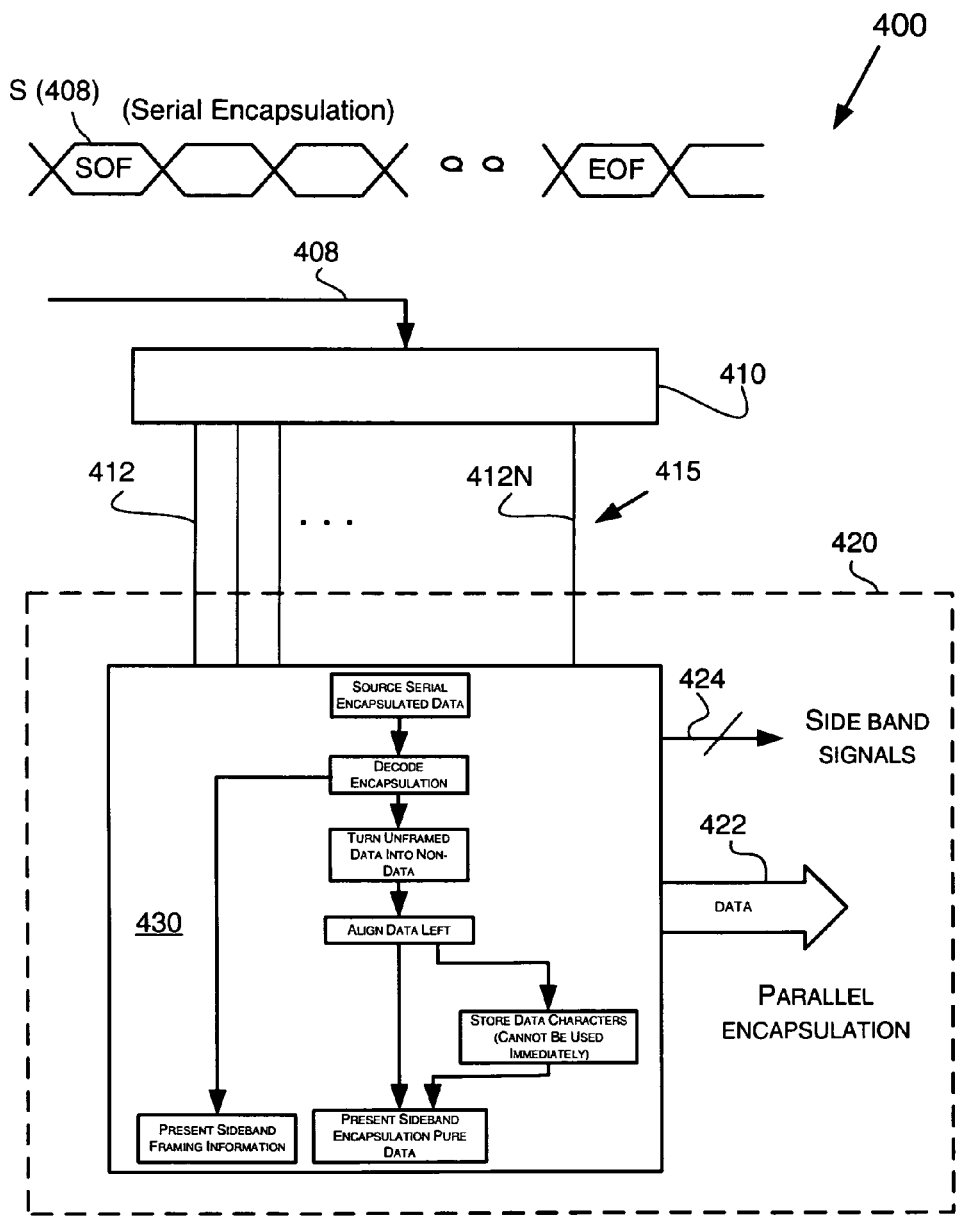
FIG. 4 is a simplified block diagram of a communication system, showing multiple serial lanes of a communication channel coupled to a receiving device comprising a serial to parallel translation module/process in accordance with an embodiment of the present invention.

Referencing FIG. 4, a transmitting device 410 of a communication system 400 may be coupled to a receiving device 420 by way of a communication channel 415. Communication channel 415 may comprise a plurality of serial data lanes of variable number N. The number of lanes may be predetermined based upon a desired throughput or bandwidth sought for the communication channel 415.

In a particular case, the transmitting device 410 at an application level 408 may need to transmit encapsulated data 512 (FIG. 5A) as may be presented by signal S(408) of known serial data encapsulation. In this example, a plurality of serial data characters 512A-512Z may be disposed sequentially as a data frame delineated between a start-of-frame (SOF) character 510 and an end-of-frame (EOF) character 520. The characters of the serial data signal S(408) may be apportioned in byte, time ordered relationship across the plurality of serial data lanes (e.g., of a known serial data link transfer protocol such as that of SERDES or AURORA or SONET) for transfer of the serial encapsulated data to receiver device 420.

At the receiver device 420, a translation module 430 may receive the signals of the plurality of serial data lanes 412A-412Z. It may then recover the serial data and reformat the recovered serially encapsulated data into a parallel data format—signal S(422) of FIG. 5B—for presentation on bus 422. Sideband control signals S(424) may also accompany the parallel data signal, and may be propagated on accompanying sideband lines 424.

In a customary solution, a fixed number of lanes 412 would define a width for channel 415. A state machine might provide a custom design for an ad hoc solution to translate the serially encapsulated data into sideband encapsulated data. The state machine may monitor each lane of the fixed number of lanes to determine receipt and location of a SOF character. The state machine would be preconfigured to provide different solutions for the various SOF lane placement possibilities that might be amongst fixed number of lanes. It may then restructure the data bytes of a data word recovered based upon the determined location of the SOF character within the data word received. Similarly, the customary state machine may further restructure the data bytes of later arriving data word(s) that may be associated with receipt of an EOF character. The real data may then be parsed from between the SOF and EOF serial encapsulation and restructured for parallel presentment with the control signals (sideband signals) on separate lines 424.

If idle characters have been removed from the data, it may be described as sideband encapsulated pure data—a format typically used by memories and processors that may be aboard the receiving device 420 (e.g., an embedded processor or memory of a programmable logic device). But the custom solutions of state-machines for example, may be viewed as rigid and inflexible for adaptation to other number N of lanes.

Typically, each design for a channel interface might have its own method of dealing with data parsing and handling. For example, assuming a customary channel of four lanes (4 MGT lanes), words may be received of a width of 8-bytes. The four lanes might be examined by a decoder circuit to determine whether the lanes have a control character or data. The results of the decoder might then be forwarded to a state machine to decide how the bytes of the word received from the serial data transceivers might be shifted around before subsequent presentment to a given application. But such state machine would be specifically designed for the four lane embodiment of the communication channel and might not work for alternative width communication channels such as channels of 3 lanes or five lanes. In addition, the solution for configuring a lookup table for example for implementing the state-machine might not be readily scaled to solutions for alternative width communication channels. Such as an alternative embodiment with a communication channel comprising 20 lanes that might bring-in 40 bytes at a time.

Figure 6:
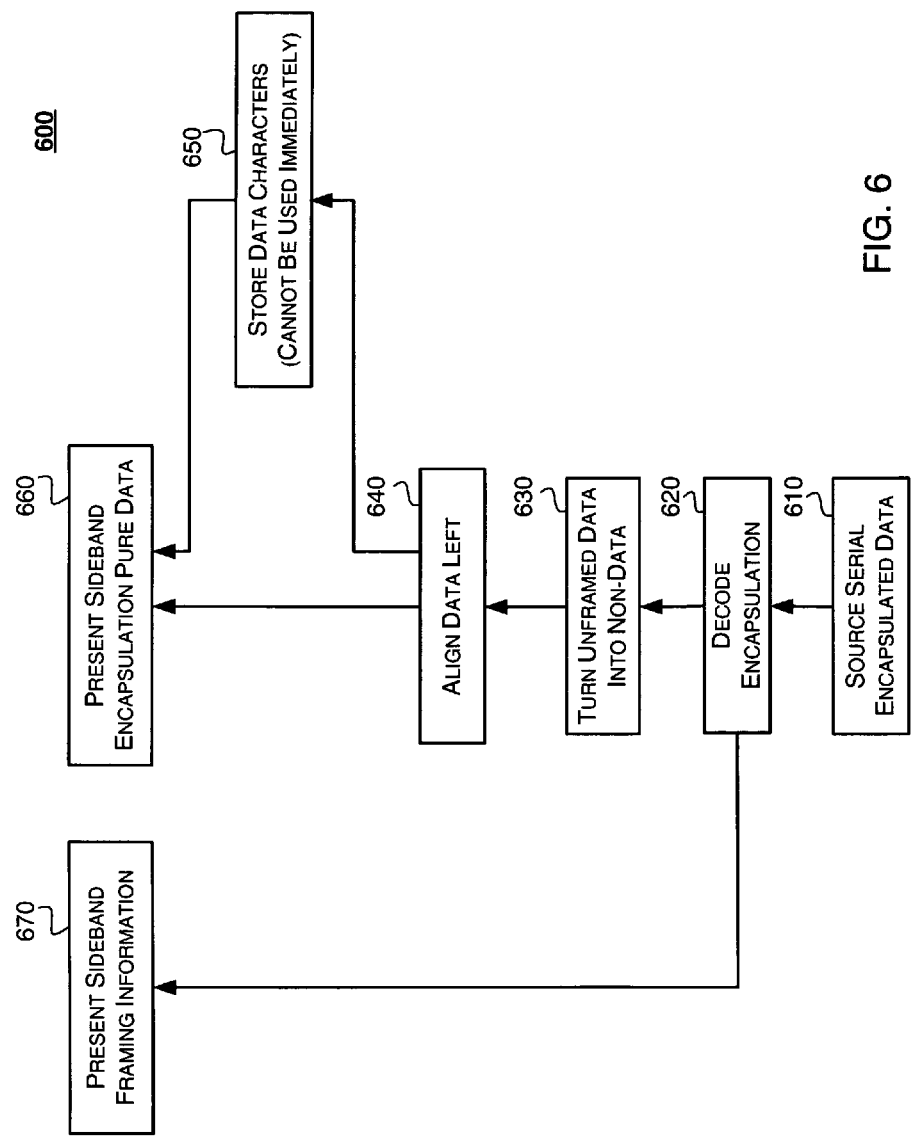
FIG. 6 is a simplified flow chart illustrating a method of data processing in accordance with an embodiment of the present invention, and showing procedures to translate serial encapsulated data to sideband encapsulated data.

Referencing FIG. 6, in accordance with an embodiment of the present invention, a source of serial encapsulated data may be presented 610 to a procedure 600 for digital data processing. For example, further referencing FIG. 7, a plurality of serial data lanes 412 of a communication channel 415 (1:N) may each present serial data signals to receivers 170(1:N) of a receiving device such as a programmable logic device (100 of FIG. 1). The receivers may recover the serial data of the respective ones of serial data lanes and present recovered characters (in synchronous bonded interrelationship) for a word output 732 of character width proportional to the number N of serial data lanes 412.

Decoders 730(1:N) may be configured to receive characters output by respective ones of the receivers and may decode (620 of FIG. 6) the characters to determine character types of the group consisting of start-of-frame, end-of-frame, real data and idle character types. In a particular embodiment, the decoders 730 may comprise content addressable memories (CAMs) preconfigured to indicate the determined character types of the various lanes to logic 750, which will note the lane location and particular word cycle from which the character types were received if detecting a SOF or EOF character. Such information may be used subsequently in method 600 when presenting 670 sideband framing information to accompany reformatted real data.

Figure 7:
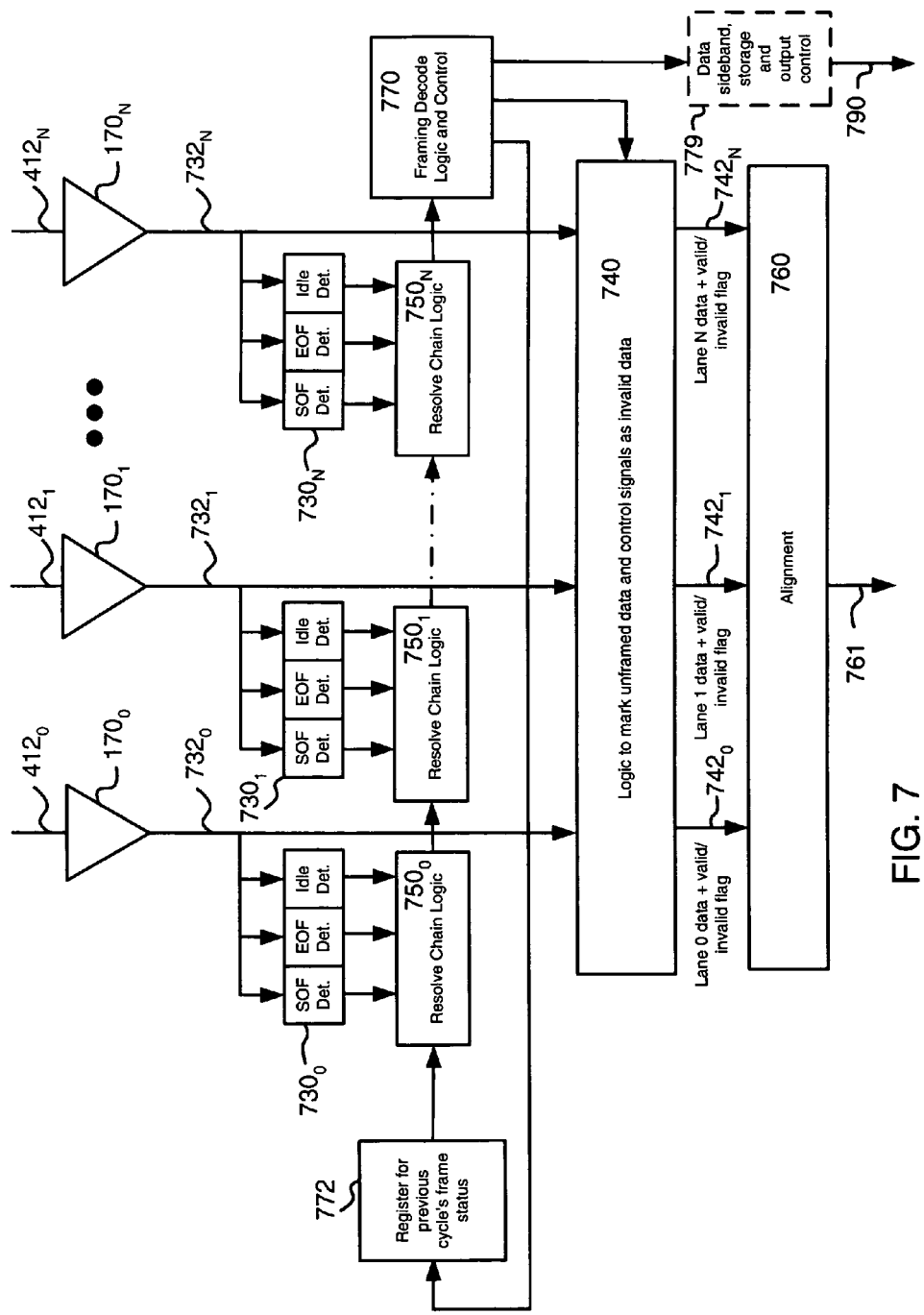
FIG. 7 is a simplified block diagram of a translation module useful to translate serial encapsulated date into parallel format, in accordance with an embodiment of the present invention.

Further referencing FIGS. 6 and 7, logic 750 in combination with decoders 770, previous cycle frame status register 772, and parser 740 may be operable collectively to mark and invalidate 630 unframed data. In a particular example, the logic and the decoder may signal parser 740 to act responsive to a SOF determination to mark unframed data characters as non-data characters based on their position relative to the SOF character. In further embodiments, they may also mark control characters as invalid data. Assuming the characters of a recovered word to comprise a left to right arrangement associated with their original time-ordered serial arrangement, then characters within a recovered word that are determined to reside on the left of the SOF character may be marked as invalid or as non-data. Additionally, the framing characters themselves may also be marked as invalid data.

In a further embodiment, an EOF character may also be detected in the recovered word the same as the SOF character. In such case, characters to the right of the determined EOF character may also be marked or masked by the parser as invalid non-data. Otherwise, remaining characters may be passed until receiving another word cycle that may present an EOF character.

Continuing with further reference to FIGS. 6 and 7, the parsed valid characters may comprise other non-data such as idle characters. But the system may need words consisting of pure data—i.e., no control characters, framing characters or idle characters. Aligning circuitry 760 acting in combination with the logic 750 and decoders 730 may operate to group the real-data together. In a particular example, the parser 740 may send a flag with each character of a given lane output 742(0:

N). The alignment module 760 may then shift the individual characters (e.g., leftward) 640 within the word dependent upon its previous identification with a valid or invalid flag indication. The resulting packed data may then be described as a contiguous set or block of data comprising real data without any idle or other non-data characters therein. In a particular case, the alignment circuitry 760 may provide left alignment of data, and may shift a character by one lane per each clock cycle. Thus, in a 20 lane design, the left align may actually spend nine clock cycles. However, in an alternative embodiment, may be able to pipeline these provisions and reduce the number of cycles required. Once the real-data has been grouped, it might then be embedded with other non-data bytes that may or may not have been previously identified.

Accordingly, the only clock cycle where idle characters or non-data characters may be present would be in a final cycle of a frame presentment. In other words, once beginning a frame presentment, full set(s) of real data may be presented in each word cycle until reaching the end. In the end cycle, logic controller 770 may source sideband signals 779 such as a count value (530 of FIG. 5B) to indicate the number of bytes of the final word output 761 that may be valid.

Because a serially delineated frame of data may span a plurality of data words, it may be noted that the EOF character may not appear in the same word of the same cycle as the SOF character. Therefore, it may be desirable to hold 650 onto data until determining the presence of further data or until detecting an EOF character. Once the EOF character is detected, the pure data may be pulled and presented 660 as output data together with presentment 670 of accompanying sideband data, such as an EOF sideband signal that may accompany the pure data output.

Further referencing FIGS. 5-7, controller 770 may control storage operations (650 FIG. 6) to storage and may also control outputs (660 FIG. 6) to output port 422 and the presentation of sideband signals (670 FIG. 6) on sideband outputs 790 as produced by controller 770. Generally, when the number of characters of the left alignment is less than the width of the output port, the controller may not necessarily present the data directly to the output port. Typically, data may be collected until a full data word has been collected for presenting on the output port. Alternatively, if the translator may receive an EOF character, the frame may be concluded with indication of a valid byte sideband signal 530 together with an indication of the number of bytes that may be missing from the output word.

Additionally, the controller may determine how many bytes from the alignment circuit 760 to move into storage. This determination may be based on the state of detected framing signals, the number of bytes already in storage, the number of bytes being presented by the alignment circuit, and the width of the output port 761. Accordingly, controller may drive a multiplexer or selection circuit to select a portion of the aligned data that may be stored into storage 780. Similarly, it may control an output multiplexer to determine whether or how much of the aligned data to present to the output port 761, either singly or in combination with data of the storage register.

In particular examples of practicing the invention, rules for implementing certain processes may be represented by regular expressions, i.e., a system for representing strings of characters similar to that used in the PERL scripting language.

TABLE 1

| Input word from Channel | No excess | excess |
|---|---|---|
| I+ | do nothing | do nothing |
| [(DI*), (I*D)]+ | pack | remainder |
| I*EI* | end storage | end storage |
| [(DI*), (I*D)]+EI* | pack, end storage | remainder, end storage |
| [(DI*), (I*D)]+EI*SI* | pack, and storage, start next | remainder, end storage, start next |
| I*S[(DI*), (I*D)]+ | start storage, overwrite | start storage, overwrite |
| I*EI*SI* | end storage, start next | end storage, start next |
| I*DI*S[(DI*), (I*D)]+ | overwrite, start storage | overwrite, start storage |
| I*EI*S[(DI*), (I*D)]+EI* | overwrite, start storage, end storage | overwrite, start storage, end storage |
| I*S[(DI*), (I*D)]+EI* | start storage, over write, end storage | start storage, overwrite, end storage |
| I*SI* | start next, invalidate | start next, invalidate |

Excess = sum of characters in left align word and storage word > max characters allowed in output word
Pack = add characters from left align to storage in time order, starting from the leftmost open position. No gaps allowed between characters.
Remainder = take enough characters from storage and left align word to fill output. Overwrite storage with the remaining characters, in time order.
Overwrite = replace the characters in storage with the characters in the left aligned word.
Invalidate = empty storage: none of the characters there will be valid on the next cycle
End storage = add qualifier to storage to indicate characters there are from a frame that has ended
Start next = add the start storage qualifier to storage on the next cycle.
Start storage = add the start storage qualifier to storage to indicate that the characters in storage are from the first word of a frame
Each input word entry is a regular expression representing a set of possible inputs. Standard regular expression syntax is used.
I = idle character, covers all non-framing non-data characters
D = data character
S = start of frame character
E = end of frame character Referencing Table 1, the rows indicate storage actions that may be performed responsive to certain input word patterns that match the combination(s) represented by the regular expressions within the first column. In other words, storage operations may be based on what is currently in storage and the characters of the recovered input word. For example, in the first line, word pattern I+ may indicate one or more idle characters (I's) at the beginning and within a word. As further represented by the table, this word-pattern I+ might trigger action as called upon under two different conditions of total characters—i.e., "no excess" and "excess." Under the "no excess" condition, the sum of characters from the left aligned word and the storage word would be less than or equal to the maximum characters permitted for the output word. In the "excess" condition, the sum of characters from the left aligned word and the storage word would be greater than the maximum characters available for the output word. Under either one of these conditions, the I+ combination would require no particular response.

In contrast to the plus notation (+) which represents one or more, the asterisk notation (*) suggests zero or more of the associated character.

For example, in the third line of Table 1, the notation I*EI* for the pattern of the channel word may represent zero or more idle characters, followed by an EOF character and further followed by zero or more idle characters. For the condition "no excess" where the total of the aligned and stored characters is less than or equal to the width of the output port, the circuitry should be responsive with "end storage," which may suggest flagging the storage to indicate that that the stored characters are from a frame that has ended.

For the second line, further referencing Table 1, the word pattern of [(DI*), (I*D)]+ comprising a data character at the beginning of the word followed by zero or more idle characters, or alternatively zero or more idle characters concluding with a data character for one or more times, which should yield a response of "pack" under the condition "no excess" and "remainder" under the condition "excess." Thus, when the total is not greater than the output width, the circuitry should add the left aligned characters to the storage in time order relationship, starting from the leftmost open position so as to leave no gaps. Alternatively, when the total would exceed the output width, the circuitry should be responsive to take enough characters from the storage and the left align word to fill the output. Additionally, the remaining characters should be overwritten into the storage in time ordered relationship.

The remaining lines provide other character patterns for an input word that may trigger the actions called for under the two different storage conditions. Accordingly, a designer may design a storage controller (770 FIG. 7) to establish a responsiveness that may meet the parameters or criteria of Table 1 for the character patterns of column one and the different total character conditions of columns two and three.

Table 2 provides other regular expressions for output actions based upon character patterns of the input word and whether or not the "storage end" flag has already been set and the total character conditions of "no excess" and "excess" as presented in columns three and four.

TABLE 2

Output operation when word finished left align

| Input word from Channel | Storage End | No excess | Excess |
|---|---|---|---|
| I+ | 0 | — | — |
| [(DI*, I* D)]+ | 0 | — | fill output |
| I* E I* | 0 | — | — |
| [(DI*), (I*D)]+ E I* | 0 | — | fill output |
| [(DI*), (I*D)]+ E I* S I* | 0 | — | fill output |
| I* S [(DI*), (I*D)]+ | 0 | — | — |
| I* E I* S I* | 0 | — | — |
| I* E I* S [(DI*), (I*D)]+ | 0 | take storage | take storage |
| I* E I* S [(DI*), (I*D)]+ E I* | 0 | take storage | take storage |
| I* S [(DI*), (I*D)]+ E I* | 0 | — | — |
| I* S I* | 0 | — | — |
| I+ | 1 | take storage | — |
| [(DI*), (I*D)]+ | 1 | illegal | illegal |
| I* E I* | 1 | illegal | illegal |
| [(DI*), (I*D)]+ E I* | 1 | illegal | illegal |
| [(DI*), (I*D)]+ E I* S I* | 1 | illegal | illegal |
| I* S [(DI*), (I*D)]+ | 1 | take storage | take storage |
| I* E I* S I* | 1 | illegal | illegal |
| I* E I* S [(DI*), (I*D)]+ | 1 | illegal | illegal |
| I* E I* S [(DI*), (I*D)]+ E I* | 1 | illegal | illegal |
| I* S [(DI*), (I*D)]+ E I* | 1 | take storage | take storage |
| I* S I* | 1 | take storage | take storage | fill output = take enough characters from storage and the left aligned word, in time order, to fill the output
take storage = take all the characters in storage and put them in output
— don't care: impossible condition
illegal = illegal condition. If this occurs, it's due to a problem with the implementation of an earlier step or illegal input.

For example, in line 2 of Table 2, the pattern [(DI*), (I*D)]+ with a Storage End flag not set and under the "excess" condition may effect an action of "fill output." Responsive to these conditions, the storage/output controller may take enough character from storage the left aligned word, in time order, to fill the output port. The "take storage" action may represent taking all of the characters in storage and putting them on the output. This action may occur responsive to the input patterns of line eight I*EI*S[(DI*), (I*D)]+ and line nine I*EI*S[(DI*), (I*D)]+EI* when the storage end flag has not been set and under either of the total character conditions "no excess" or "excess". In other words, if an EOF character arrives and the storage flag has not yet been set, take the storage before starting the next frame of data. Additional provisions of Table 2 may be used to establish the parameters for an embodiment of an output controller.

Tables 3, 4 and 5, outline the design parameters for the sideband signals Word Valid, Start Of Frame and End Of Frame respectively. The parameters may be outlined in the first three columns—the character pattern of the input word in column one, the "Storage Start" flag in column two and the "Storage End" flag in column three. The flags "Storage Start" and "Storage End" may be set when the decode (620 FIG. 6) causes storage of information about whether a frame has begun or ended. For example, if the decoders sees an EOF character, then when the data associated with the word leaves the left align data for storage, the controller may activate the "Storage End" flag to indicate that the data currently in storage is data from a frame that has ended.

TABLE 3

Word Valid when word finishes left align

| Input word from Channel | Storage start | Storage end | no excess | Excess |
|---|---|---|---|---|
| I* | 0 | 0 | 0 | — |
| [(DI*), (I*D)]+ | 0 | 0 | 0 | 1 |
| I* E I* | 0 | 0 | 0 | — |
| [(DI*), (I*D)]+ E I* | 0 | 0 | 0 | 1 |
| [(DI*), (I*D)]+ E I* S I* | 0 | 0 | 0 | 1 |
| I* S [(DI*), (I*D)]+ | 0 | 0 | 0 | 0 |
| I* E I* S I* | 0 | 0 | 0 | — |
| I* E I* S [(DI*), (I*D)]+ | 0 | 0 | 1 | 1 |
| I* E I* S [(DI*), (I*D)]+ E I* | 0 | 0 | 1 | 1 |
| I* S [(DI*), (I*D)]+ E I* | 0 | 0 | 0 | 0 |
| I* S I* | 0 | 0 | 0 | — |
| I* | 1 | 0 | 0 | 0 |
| [(DI*), (I*D)]+ | 1 | 0 | 0 | 1 |
| I* E I* | 1 | 0 | 0 | — |
| [(DI*), (I*D)]+ E I* | 1 | 0 | 0 | 1 |
| [(DI*), (I*D)]+ E I* S I* | 1 | 0 | 0 | 1 |
| I* S [(DI*), (I*D)]+ | 1 | 0 | illegal | Illegal |
| I* E I* S I* | 1 | 0 | 0 | — |
| I* E I* S [(DI*), (I*D)]+ | 1 | 0 | 1 | 1 |
| I* E I* S [(DI*), (I*D)]+ E I* | 1 | 0 | 1 | 1 |
| I* S [(DI*), (I*D)]+ E I* | 1 | 0 | illegal | illegal |
| I* S I* | 1 | 0 | illegal | illegal |
| I* | 0 | 1 | 1 | 1 |
| [(DI*), (I*D)]+ | 0 | 1 | illegal | illegal |
| I* E I* | 0 | 1 | illegal | illegal |
| [(DI*), (I*D)]+ E I* | 0 | 1 | illegal | illegal |
| [(DI*), (I*D)]+ E I* S I* | 0 | 1 | illegal | illegal |
| I* S [(DI*), (I*D)]+ | 0 | 1 | 1 | 1 |
| I* E I* S I* | 0 | 1 | illegal | illegal |
| I* E I* S [(DI*), (I*D)]+ | 0 | 1 | illegal | illegal |
| I* E I* S [(DI*), (I*D)]+ E I* | 0 | 1 | illegal | illegal |
| I* S [(DI*), (I*D)]+ E I* | 0 | 1 | 1 | 1 |
| I* S I* | 0 | 1 | 1 | 1 |
| I* | 1 | 1 | 1 | 1 |
| [(DI*), (I*D)]+ | 1 | 1 | illegal | illegal |
| I* E I* | 1 | 1 | illegal | illegal |
| [(DI*), (I*D)]+ E I* | 1 | 1 | illegal | illegal |
| [(DI*), (I*D)]+ E I* S I* | 1 | 1 | illegal | illegal |
| I* S [(DI*), (I*D)]+ | 1 | 1 | 1 | 1 |
| I* E I* S I* | 1 | 1 | illegal | illegal |
| I* E I* S [(DI*), (I*D)]+ | 1 | 1 | illegal | illegal |
| I* E I* S [(DI*), (I*D)]+ E I* | 1 | 1 | illegal | illegal |
| I* S [(DI*), (I*D)]+ E I* | 1 | 1 | 1 | 1 |
| I* S I* | 1 | 1 | 1 | 1 |

Table 3 defines the criteria of the sideband generator (790 FIG. 7) for generating the "Word Valid" control sideband signal (526 FIG. 5B). "Word Valid" may be provided as sideband signal to indicate when pure data may actually be present on the output. At times, the receiver may be receiving only idle characters. Therefore, the Word Valid control signal may be used to indicate when valid output data is available and when it is not. As represented by the table, the status of this signal may be determined based on the character pattern of the word input from the channel, the Storage Start and Storage End flags, and also the total character count conditions "no excess" and "excess."

Last two tables establish the regular expressions for defining the Start of Frame and the End of Frame sideband control signals (522 and 524 FIG. 5B). Even though the SOF and EOF characters may have already been determined by the decoder, the sideband control signals may need to be timed time with the data so that they may signal appropriately in time with their associated data. Accordingly, these tables may appear simpler.

TABLE 4

Start of Frame after input word finishes left align

| Input word from Channel | Storage start | Storage end | no excess | excess |
|---|---|---|---|---|
| I* | 0 | 0 | 0 | 0 |
| [(DI*), (I*D)]+ | 0 | 0 | 0 | 0 |
| I* E I* | 0 | 0 | 0 | 0 |
| [(DI*), (I*D)]+ E I* | 0 | 0 | 0 | 0 |
| [(DI*), (I*D)]+ E I* S I* | 0 | 0 | 0 | 0 |
| I* S [(DI*), (I*D)]+ | 0 | 0 | 0 | 0 |
| I* E I* S I* | 0 | 0 | 0 | 0 |
| I* E I* S [(DI*), (I*D)]+ | 0 | 0 | 0 | 0 |
| I* E I* S [(DI*), (I*D)]+ E I* | 0 | 0 | 0 | 0 |
| I* S [(DI*), (I*D)]+ E I* | 0 | 0 | 0 | 0 |
| I* S I* | 0 | 0 | 0 | 0 |
| I* | 1 | 0 | 0 | — |
| [(DI*), (I*D)]+ | 1 | 0 | 0 | 1 |
| I* E I* | 1 | 0 | 0 | — |
| [(DI*), (I*D)]+ E I* | 1 | 0 | 0 | 1 |
| [(DI*), (I*D)]+ E I* S I* | 1 | 0 | 0 | 1 |
| I* S [(DI*), (I*D)]+ | 1 | 0 | illegal | Illegal |
| I* E I* S I* | 1 | 0 | 0 | — |
| I* E I* S [(DI*), (I*D)]+ | 1 | 0 | 1 | 1 |
| I* E I* S [(DI*), (I*D)]+ E I* | 1 | 0 | 1 | 1 |
| I* S [(DI*), (I*D)]+ E I* | 1 | 0 | illegal | illegal |
| I* S I* | 1 | 0 | illegal | illegal |
| I* | 0 | 1 | 0 | 0 |
| [(DI*), (I*D)]+ | 0 | 1 | illegal | illegal |
| I* E I* | 0 | 1 | illegal | illegal |
| [(DI*), (I*D)]+ E I* | 0 | 1 | illegal | illegal |
| [(DI*), (I*D)]+ E I* S I* | 0 | 1 | illegal | illegal |
| I* S [(DI*), (I*D)]+ | 0 | 1 | 0 | 0 |
| I* E I* S I* | 0 | 1 | illegal | illegal |
| I* E I* S [(DI*), (I*D)]+ | 0 | 1 | illegal | illegal |
| I* E I* S [(DI*), (I*D)]+ E I* | 0 | 1 | illegal | illegal |
| I* S [(DI*), (I*D)]+ E I* | 0 | 1 | 0 | 0 |
| I* S I* | 0 | 1 | 0 | 0 |
| I* | 1 | 1 | 1 | 1 |
| [(DI*), (I*D)]+ | 1 | 1 | illegal | illegal |
| I* E I* | 1 | 1 | illegal | illegal |
| [(DI*), (I*D)]+ E I* | 1 | 1 | illegal | illegal |
| [(DI*), (I*D)]+ E I* S I* | 1 | 1 | illegal | illegal |
| I* S [(DI*), (I*D)]+ | 1 | 1 | 1 | 1 |
| I* E I* S I* | 1 | 1 | illegal | illegal |
| I* E I* S [(DI*), (I*D)]+ | 1 | 1 | illegal | illegal |
| I* E I* S [(DI*), (I*D)]+ E I* | 1 | 1 | illegal | illegal |
| I* S [(DI*), (I*D)]+ E I* | 1 | 1 | 1 | 1 |
| I* S I* | 1 | 1 | 1 | 1 |

Referencing Table 4, the Start of Frame sideband control signal may be activated responsive to provisions of essentially the last portion of the table, in which the Storage Start flag has been set in storage. Additionally, it may be activated when necessary to send data out the output port, e.g., where the excess condition may demand or an EOF character signals the conclusion of the previous frame.

TABLE 5

End of Frame after input word finishes left align

| Input word from Channel | Storage start | Storage end | no excess | excess |
|---|---|---|---|---|
| I* | 0 | 0 | 0 | 0 |
| [(DI*), (I*D)]+ | 0 | 0 | 0 | 0 |
| I* E I* | 0 | 0 | 0 | 0 |
| [(DI*), (I*D)]+ E I* | 0 | 0 | 0 | 0 |
| [(DI*), (I*D)]+ E I* S I* | 0 | 0 | 0 | 0 |
| I* S [(DI*), (I*D)]+ | 0 | 0 | 0 | 0 |
| I* E I* S I* | 0 | 0 | 0 | 0 |
| I* E I* S [(DI*), (I*D)]+ | 0 | 0 | 0 | 0 |
| I* E I* S [(DI*), (I*D)]+ E I* | 0 | 0 | 0 | 0 |
| I* S [(DI*), (I*D)]+ E I* | 0 | 0 | 0 | 0 |
| I* S I* | 0 | 0 | 0 | 0 |
| I* | 1 | 0 | 0 | — |
| [(DI*), (I*D)]+ | 1 | 0 | 0 | 0 |
| I* E I* | 1 | 0 | 0 | — |
| [(DI*), (I*D)]+ E I* | 1 | 0 | 0 | 0 |
| [(DI*), (I*D)]+ E I* S I* | 1 | 0 | 0 | 0 |
| I* S [(DI*), (I*D)]+ | 1 | 0 | illegal | illegal |
| I* E I* S I* | 1 | 0 | 0 | — |
| I* E I* S [(DI*), (I*D)]+ | 1 | 0 | 1 | 1 |
| I* E I* S [(DI*), (I*D)]+ E I* | 1 | 0 | 1 | 1 |
| I* S [(DI*), (I*D)]+ E I* | 1 | 0 | illegal | illegal |
| I* S I* | 1 | 0 | illegal | illegal |
| I* | 0 | 1 | 1 | 1 |
| [(DI*), (I*D)]+ | 0 | 1 | illegal | illegal |
| I* E I* | 0 | 1 | illegal | illegal |
| [(DI*), (I*D)]+ E I* | 0 | 1 | illegal | illegal |
| [(DI*), (I*D)]+ E I* S I* | 0 | 1 | illegal | illegal |
| I* S [(DI*), (I*D)]+ | 0 | 1 | 1 | 1 |
| I* E I* S I* | 0 | 1 | illegal | illegal |
| I* E I* S [(DI*), (I*D)]+ | 0 | 1 | illegal | illegal |
| I* E I* S [(DI*), (I*D)]+ E I* | 0 | 1 | illegal | illegal |
| I* S [(DI*), (I*D)]+ E I* | 0 | 1 | 1 | 1 |
| I* S I* | 0 | 1 | 1 | 1 |
| I* | 1 | 1 | 1 | 1 |
| [(DI*), (I*D)]+ | 1 | 1 | illegal | illegal |
| I* E I* | 1 | 1 | illegal | illegal |
| [(DI*), (I*D)]+ E I* | 1 | 1 | illegal | illegal |
| [(DI*), (I*D)]+ E I* S I* | 1 | 1 | illegal | illegal |
| I* S [(DI*), (I*D)]+ | 1 | 1 | 1 | 1 |
| I* E I* S I* | 1 | 1 | illegal | illegal |
| I* E I* S [(DI*), (I*D)]+ | 1 | 1 | illegal | illegal |
| I* E I* S [(DI*), (I*D)]+ E I* | 1 | 1 | illegal | illegal |
| I* S [(DI*), (I*D)]+ E I* | 1 | 1 | 1 | 1 |
| I* S I* | 1 | 1 | 1 | 1 |

In this last table, Table 5, the sideband control signal End of Frame may be activated essentially anytime that the EOF character has been received with a previously activated Storage Start flag, or a previously activated Storage End flag. Additionally, the End of Frame sideband control signal may be further activated when both of the Storage Start and Storage End flags have previously been set.

In particular embodiments, the functionality of the storage or output controller might be implemented in known fashion by a state-machine and/or a microprocessor programmed for performing functionally illustrated operations.

While certain exemplary features of the embodiments of the invention have been illustrated and described herein, many modifications, substitutions, changes and equivalents may now occur to those skilled in the art. It is, therefore, to be understood that the appended claims are intended to cover all such embodiments and changes as fall within the spirit of the invention.

The invention claimed is:

1. A method of processing data of a data communication channel, comprising:
   receiving a plurality of serial data signals from lanes of the communication channel;
   de-multiplexing serial data from each of the serial data signals received from the lanes and formatting the serial data into parallel data;
   checking the parallel data for a start-of-frame (SOF) character;
   responsive to detecting the SOF character, parsing the parallel data into invalid data and valid data, wherein valid data does not include control characters;
   basing the parsing of the parallel data at least in part on placement relative to the SOF character;
   packing the parsed valid data into a group of data;
   presenting the packed group of data; and
   activating an SOF sideband signal when beginning the presenting of the packed group of data;
   the SOF sideband signal being separate signaling from the packed group of data and presented in association with the packed group of data for sideband encapsulation.

2. The method of claim 1, further comprising:
   checking the parallel data for an end-of-frame (EOF) character;
   the parsing the parallel data to include:
      determining if a character of the parallel data is outside a frame bounded by the SOF character and the EOF character; and
      if the character is determined to be outside the frame, defining the character as being part of the invalid data.

3. The method of claim 2, wherein the parsing further includes defining the SOF character and the EOF character as being part of the invalid data.

4. The method of claim 3, wherein the parsing further includes:
   checking for one or more idle characters between the SOF character and the EOF character; and
   responsive to detecting the one or more idle characters between the SOF character and the EOF character, defining the one or more idle characters as part of the invalid data.

5. The method of claim 2, wherein the packing configures the valid data into a contiguous group.

6. The method of claim 5, further comprising activating an EOF sideband signal when sending out a last portion of the contiguous group.

7. The method of claim 6, wherein the packing comprises aligning the valid data of the contiguous group with one of a left alignment or a right alignment relative to at least one of the SOF sideband signal and the EOF sideband signal.

8. The method of claim 2, wherein:
   the receiving comprises receiving sequential words each having a byte width proportional to number of the lanes;
   the checking for the EOF character comprises:
      examining bytes in an initial word including the SOF character; and
      if the EOF character is not found in the initial word, the method further comprising repeating for subsequent words the receiving, de-multiplexing, parsing and packing at least until finding the EOF character.

9. The method of claim 8, wherein characters forming the words have a left to right relationship corresponding to time-ordered placement of the characters.

10. The method of claim 8, further comprising performing at least one of storing and outputting the valid data based on number of the characters thereof previously packed, the amount of the valid data packed during the repeating, and size of the valid data output.

11. The method of claim 10, wherein the valid data of the repeating is stored when a total of the valid data is less than or equal the size of the valid data output, and when the EOF character has not been found.

12. The method of claim 11, wherein a portion of the valid data of the repeating is output together with the valid data previously packed, and a remaining portion of the valid data of the repeating is stored when the total exceeds the size of the valid data output.

13. The method of claim 11, wherein the valid data packed is output when the EOF character has been found.

14. The method of claim 1, further comprising:
   identifying a number of the lanes in the communication channel; and
   configuring serial-to-parallel data receivers to receive and de-multiplex the serial data signals of the identified number of the lanes to form output characters for the parallel data.

15. A circuit to interface communications channel comprising:
   serial-to-parallel receivers configured to receive serial data signals of data lanes of the communications channel and to recover characters of parallel format from the data lanes;
   decoders configured to determine character types of the characters recovered by the serial-to-parallel receivers of from the data lanes;
   detectors configured to detect a start-of-frame (SOF) character and an end-of-frame (EOF) character;
   a parser configured to parse the characters recovered by the serial-to-parallel receivers based on the character types determined by the decoders and based on placement of the characters relative to the SOF character detected for separating out valid data and invalid data from the characters recovered;
   a packer configured to group the valid data from the characters parsed to provide a valid data group; and
   a generator configured to provide the SOF character as a first sideband signal associated with the valid data group for sideband encapsulation.

16. The circuit of claim 15, wherein the decoders resolve the character types from a group consisting of the SOF character, the EOF character, valid data characters, and an idle character; and
   the parser invalidates those of the characters determined to be outside a frame delineated by at least one of the SOF character and the EOF character detected.

17. The circuit of claim 16, wherein the packer is configured to pack the valid data characters of the characters determined to be inside the frame after being decoded, and to align the valid data characters packed with one of a left or right alignment; and
   the generator is configured to provide the SOF character as a second sideband signal associated with the valid data group for the sideband encapsulation.

18. The circuit of claim 17, wherein the parser and the packer further group the valid data characters packed into a contiguous block, the contiguous block not having any said idle character between the valid data characters.

19. The circuit of claim 17, further comprising:
   storage registers accessible to store characters for subsequent retrieval; and

17 a storage controller to transfer the valid data characters aligned to the storage registers if the detectors determine absence of the EOF character.

20. The circuit of claim 19, further comprising:
a data output port having a word width;
the storage controller configured to determine a first amount of the valid data characters aligned and a second amount of the valid data characters stored in the storage registers; and
the storage controller further configured for comparing a total of the first amount and the second amount to the word width of the data output port, a first result of the comparing being that the total is greater than the word width and a second result of the comparing being the total is at least equal to the word width; and
responsive to the first result, the storage controller configured to transfer at least a portion of the valid data characters aligned to the storage registers.

21. The circuit of claim 20, further comprising an output controller configured to enable transfer of the valid data characters to the data output port responsive to the detector detecting the EOF character, responsive to the second result, or responsive to both the detector detecting the EOF character and the second result.

22. The circuit of claim 21, wherein the storage controller and the output controller are further configured, responsive to the first result, to take characters from the storage registers and a first portion of the valid data characters to form and present an output word on the data output port.

23. The circuit of claim 22, wherein the storage controller and the output controller are further configured to write a remaining portion of the valid data characters aligned into the storage registers.

24. A system to interface with a communication channel having a plurality of serial data lanes, comprising:
receivers to receive serial data from the serial data lanes, each receiver of the receivers including a serial-to-parallel converter to convert the serial data received to a parallel format;
the receivers providing outputs that collectively form a word having a width related to a total number of the serial data lanes;
decoders configured to identify character types recovered by the receivers;
logic configured to determine when a decoder of the decoders has identified at least one of the character types of a group consisting of a start-of-frame (SOF) character and an end-of-frame (EOF) character;
parsing circuitry configured to parse valid characters of the word based upon placement relative to the at least one of the character types identified;
storage registers selectively operable to store the valid characters; and
a controller to control presentment of the valid characters parsed as valid data to at least one of the storage registers and an output port, the presentment of the valid characters based on the character types identified by the decoders, placements of the SOF character, a first amount of the valid characters parsed by the parsing circuitry, and a second amount of the valid characters stored in the storage registers; and
a generator configured to provide a first sideband signal associated with the valid data for output as sideband encapsulated, the first sideband signal being responsive to the SOF character.

25. The system of claim 24, wherein the generator is configured to present the first sideband signal as a sideband start-of-frame (SOF) signal to accompany the valid data at the output port when first presented.

18

26. The system of claim 25, wherein the generator is further configured to present a second sideband signal as a sideband end-of-frame (EOF) signal to accompany the valid data parsed at the output port when a decoder of the decoders and the logic have determined an EOF character and the controller has enabled presentment of a word of the valid data associated with the EOF character.

27. The system of claim 26, wherein the generator is further configured to present a data valid signal when the valid data parsed and the second sideband signal are presented at the output port.

28. The system of claim 24, wherein the logic is further configured to determine when a decoder of the decoders has identified valid character types and when the decoder has identified idle character types.

29. The system of claim 28, further comprising alignment circuitry configured to align the valid characters into a contiguous block with one of a left alignment as associated with the SOF character or a right alignment as associated with the EOF character.

30. The system of claim 29, wherein the controller is further configured to store a first portion of the valid characters aligned in the storage registers when a total of the valid characters aligned combined with the characters in the storage register is less than or equal to the width of the output port.

31. The system of claim 30, wherein the controller is further configured to store a remaining portion of the valid characters aligned in the storage register when the total exceeds the width of the output port.

32. The system of claim 30, wherein the controller is operable to output the characters stored in the storage registers responsive to the logic determining that a decoder of the decoders has identified the EOF character.

33. The system of claim 28, wherein:
at least a portion of the receivers, the decoders, the logic, the parsing circuitry, the storage registers, and the controller comprise devices embedded within a programmable logic device; and
another portion thereof comprise configured programmable resources of the programmable logic device.

34. The system of claim 33, wherein the programmable logic device comprises configuration memory programmed with configuration data operable to configure the programmable resources adaptive to the total number of the serial data lanes.

35. The system of claim 33, wherein the decoders comprise content addressable memories embedded within the programmable logic device and configurable per the programmable resources of the programmable logic device to receive the outputs of the receivers and to source decode information to the logic.

36. A circuit to interface to a communications channel comprising:
means for receiving data signals from data lanes of the communication channel;
de-multiplexing means for recovering serial data from the data signals and converting the serial data into parallel data;
decode means for decoding characters recovered by the de-multiplexing means;
detection means for detecting a start-of-frame (SOF) character and an end-of-frame (EOF) character;
parser means for parsing characters based upon type decoded and placement relative to the SOF character;
grouping means for grouping together the characters parsed; and means for generating a sideband signal for output with the characters parsed, the sideband signal generated responsive to the SOF character for sideband encapsulation.

37. The circuit of claim 36, wherein the decode means resolves character types of a group consisting of at least one of the SOF character, the EOF character, valid data characters, and idle data characters; and
the parser means further bases the parsing upon whether the character placement is outside a frame delineated by at least one of the SOF character and the EOF character.

38. The circuit of claim 37, wherein the grouping means groups valid data characters parsed inside the frame into a contiguous block with one of a left alignment as associated with the SOF character or a right alignment as associated with the EOF character.

39. The circuit of claim 38, wherein the contiguous block has no idle characters.

* * * * *